United States Patent
Hwang et al.

(10) Patent No.: US 9,954,790 B2
(45) Date of Patent: Apr. 24, 2018

(54) METHOD FOR FLOW CONTROL IN NETWORK

(71) Applicant: ELECTRONICS AND TELECOMMUNICATIONS RESEARCH INSTITUTE, Daejeon (KR)

(72) Inventors: Hyun Yong Hwang, Daejeon (KR); Ae Soon Park, Daejeon (KR); Kyoung Seok Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 78 days.

(21) Appl. No.: 14/931,547

(22) Filed: Nov. 3, 2015

(65) Prior Publication Data
US 2016/0127243 A1 May 5, 2016

(30) Foreign Application Priority Data

Nov. 4, 2014 (KR) .................. 10-2014-0152410
Nov. 2, 2015 (KR) .................. 10-2015-0153299

(51) Int. Cl.
| | | |
|---|---|---|
| *H04L 12/801* | (2013.01) | |
| *H04L 12/823* | (2013.01) | |
| *H04W 24/02* | (2009.01) | |
| *H04W 28/02* | (2009.01) | |
| *H04L 12/835* | (2013.01) | |

(Continued)

(52) U.S. Cl.
CPC ............ *H04L 47/32* (2013.01); *H04L 1/1621* (2013.01); *H04L 47/30* (2013.01); *H04L 47/323* (2013.01); *H04L 47/34* (2013.01); *H04W 28/0273* (2013.01); *H04L 2001/0097* (2013.01)

(58) Field of Classification Search
CPC ....... H04L 47/323; H04L 47/30; H04L 47/34; H04L 1/1621; H04L 47/32; H04L 2001/0097; H04W 28/0273
See application file for complete search history.

(56) References Cited

U.S. PATENT DOCUMENTS

2012/0144433 A1 * 6/2012 Won ............... H04N 21/234327
                                                                725/62
2012/0257509 A1 * 10/2012 Natarajan .......... H04B 7/15521
                                                                370/241
2013/0182582 A1    7/2013 Bontu et al.
(Continued)

FOREIGN PATENT DOCUMENTS

KR    20140107088 A    9/2014
KR    20140121246 A    10/2014

*Primary Examiner* — Brian D Nguyen
(74) *Attorney, Agent, or Firm* — Rabin & Berdo, P.C.

(57) ABSTRACT

Methods for flow control in a network are disclosed. In a dual connectivity network environment where a master base station and a secondary base station exist, an operation method of a master base station may comprise transmitting a data frame including a plurality of data packets to a secondary base station; receiving, from the secondary base station, a delivery status frame requesting retransmission of error data packet among the plurality of data packets; and retransmitting the error data packet indicated by the delivery status frame to the secondary base station. Therefore, network performance can be enhanced.

16 Claims, 3 Drawing Sheets

(51) Int. Cl.
*H04L 1/16* (2006.01)
*H04L 1/00* (2006.01)

(56) References Cited

U.S. PATENT DOCUMENTS

| | | | |
|---|---|---|---|
| 2014/0140352 A1* | 5/2014 | Isobe | H04L 47/27 370/413 |
| 2014/0226621 A1* | 8/2014 | Choi | H04W 36/0061 370/331 |
| 2014/0293896 A1 | 10/2014 | Kuo | |
| 2014/0302845 A1* | 10/2014 | Kim | H04W 48/16 455/434 |
| 2014/0335882 A1 | 11/2014 | Lee et al. | |
| 2015/0036630 A1* | 2/2015 | Chen | H04W 72/085 370/329 |
| 2015/0131428 A1* | 5/2015 | Lim | H04L 43/0835 370/216 |
| 2015/0230236 A1* | 8/2015 | Zeng | H04L 41/0806 370/329 |
| 2016/0088647 A1* | 3/2016 | Yi | H04W 72/1205 370/329 |
| 2016/0249364 A1* | 8/2016 | Siomina | H04W 28/048 |

\* cited by examiner

METHOD FOR FLOW CONTROL IN NETWORK

CROSS-REFERENCE TO RELATED APPLICATIONS

This application claims priorities to Korean Patent Application No. 10-2014-0152410 filed on Nov. 4, 2014 and Korean Patent Application No. 10-2015-0153299 filed on Nov. 2, 2015 in the Korean Intellectual Property Office (KIPO), the entire contents of which are hereby incorporated by reference.

BACKGROUND

1. Technical Field

The present disclosure relates to a communication technology, and more specifically, to methods of flow control for dual connectivity in a mobile communication network.

2. Related Art

Recently, uses of a variety of mobile devices (e.g., smart phone, tablet personal computer (PC), etc.) are increasing. Accordingly, the amount of traffics is rapidly increasing. It has a limitation to process the traffic caused by the increasing mobile devices by using the conventional networks. In order to overcome the above problem, a small cell technology can be introduced.

A small cell may have a coverage with a radius smaller than 200 meters. On the contrary, a macro cell may have a coverage with a radius of 20 kilometers. A base station supporting the small cell may have a smaller size in comparison with a base station supporting the macro cell. Therefore, it takes smaller costs to install the base station supporting the small cell in comparison with the base station supporting the macro cell. For example, the base stations supporting the small cells can be installed in coverage holes of the macro cells (e.g., edge regions of macro cells) thereby improving network performance. Also, the small cell may offload the traffic of the macro cell thereby improving network performance.

Meanwhile, a terminal (user equipment; UE) supporting dual connectivity may be connected simultaneously with a base station supporting a macro cell (hereinafter, referred to as a 'master eNB (MeNB)') and a base station supporting a small cell (hereinafter, referred to as a 'secondary eNB (SeNB)'), and transmit/receive data packets. In the above dual connectivity environment, the MeNB may be connected to the SeNB via a non-ideal backhaul. In this case, errors may occur in data packets transmitted from the MeNB to the SeNB.

Also, the SeNB may transmit the data packets received from the MeNB to the UE. Due to a communication failure between the SeNB and the UE, a situation that the UE does not receive the data packets transmitted by the SeNB may occur. In this situation, the SeNB may receive new data packets from the MeNB even when data packets to be transmitted to the UE are still stored in a buffer. Therefore, load in the SeNB may increase if a proper flow control operation is not performed between the base stations.

SUMMARY

Accordingly, exemplary embodiments of the present disclosure provide methods for retransmitting error data packets in dual connectivity environments. Also, exemplary embodiments of the present disclosure provide methods for controlling transmission of data packets in dual connectivity environments.

In order to achieve the objective of the present disclosure, an operation method of a master base station in a network, the method comprises transmitting a data frame including a plurality of data packets to a secondary base station; receiving, from the secondary base station, a delivery status frame requesting retransmission of error data packet among the plurality of data packets; and retransmitting data packet corresponding to the error data packet indicated by the delivery status frame to the secondary base station.

Here, the data frame includes a first information element (IE) indicating a type of the data frame and a second IE indicating respective sequence numbers of the plurality of data packets.

Here, the delivery status frame includes a first information element (IE) indicating a type of the delivery status frame, a second IE indicating a last sequence number among sequence numbers of data packets which have been transmitted from the secondary base station to a terminal, a third IE indicating existence of a fourth IE indicating the error data packet, and the fourth IE.

Here, the delivery status frame further includes a fifth IE indicating a size of a buffer for a bearer between the master base station and the secondary base station, and a sixth IE indicating a size of a buffer for the terminal.

Here, the fourth IE includes information indicating a number of sequence number groups each of which comprises continuous sequence numbers among sequence numbers of the error data packet, information indicating respective start sequence numbers of the sequence number groups, and information indicating respective end sequence numbers of the sequence number groups.

In addition, the method further comprises deleting data packets which are not indicated as the error data packet by the delivery status frame among the plurality of data packets from a buffer of the master base station.

Here, the plurality of data packets are transmitted to a terminal via the secondary base station, and the terminal is connected with the master base station and the secondary base station.

In order to achieve the objective of the present disclosure, an operation method of a secondary base station in a network, the method comprises receiving a data frame including a plurality of data packets from a master base station; generating a delivery status frame requesting retransmission of error data packet among the plurality of data packets; and transmitting the delivery status frame to the master base station.

Here, the data frame includes a first information element (IE) indicating a type of the data frame and a second IE indicating respective sequence numbers of the plurality of data packets.

Here, the delivery status frame includes a first information element (IE) indicating a type of the delivery status frame, a second IE indicating a last sequence number among sequence numbers of data packets which have been transmitted from the secondary base station to a terminal, a third IE indicating existence of a fourth IE indicating the error data packet, and the fourth IE.

Here, the delivery status frame further includes a fifth IE indicating a size of a buffer for a bearer between the master base station and the secondary base station, and a sixth IE indicating a size of a buffer for the terminal.

Here, the fourth IE includes information indicating a number of sequence number groups each of which comprises continuous sequence numbers among sequence numbers of the error data packet, information indicating respective start sequence numbers of the sequence number groups, and information indicating respective end sequence numbers of the sequence number groups.

In addition, the method further comprises receiving a data frame including data packet corresponding to the error data packet indicated by the delivery status frame from the master base station.

Here, the plurality of data packets are transmitted to a terminal via the secondary base station, and the terminal is connected with the master base station and the secondary base station.

In order to achieve the objective of the present disclosure, an operation method of a master base station in a network, the method comprises receiving, from a secondary base station, a first frame requesting to stop transmission of data packets; stopping the transmission of data packets to the secondary base station in response to the first frame; and resuming the transmission of data packets to the secondary base station when a predetermined event occurs.

Here, the first frame includes a first information element (IE) indicating to stop the transmission of data packets, and a second IE indicating a time period during which the transmission of data packets is stopped.

Here, the transmission of data packets to the secondary base station is resumed when the time period indicated by the second IE expires.

Here, the transmission of data packets to the secondary base station is resumed when a second frame requesting to resume the transmission of data packets is received from the secondary base station.

Here, the first frame requests to stop the transmission of data packets for at least one specific data bearer between the master base station and the secondary base station.

Here, the first frame requests to stop the transmission of data packets for at least one specific terminal.

According to exemplary embodiments of the present disclosure, the secondary base station may receive data packets from the master base station. When error data packets exist, the secondary base station may request the macro base station to retransmit the error packets. The macro base station may retransmit the requested error data packets to the secondary base station. Therefore, transmission reliability of data packets may be enhanced.

In a case that the secondary base station cannot transmit data packets to the terminal, the secondary base station may request the master base station to stop data packet transmission to the secondary base station. Also, the master base station may stop data packet transmission according to the request of the secondary base station. The master base station may resume the stopped data packet transmission when the master base station receives a request to resume the stopped data packet transmission from the secondary base station or when a predetermined time period expires. Therefore, the load of the secondary base station may be decreased.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific example embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in greater detail with reference to the accompanying drawings. In order to facilitate general understanding in describing the present invention, the same components in the drawings are denoted with the same reference signs, and repeated description thereof will be omitted.

Figure 1:
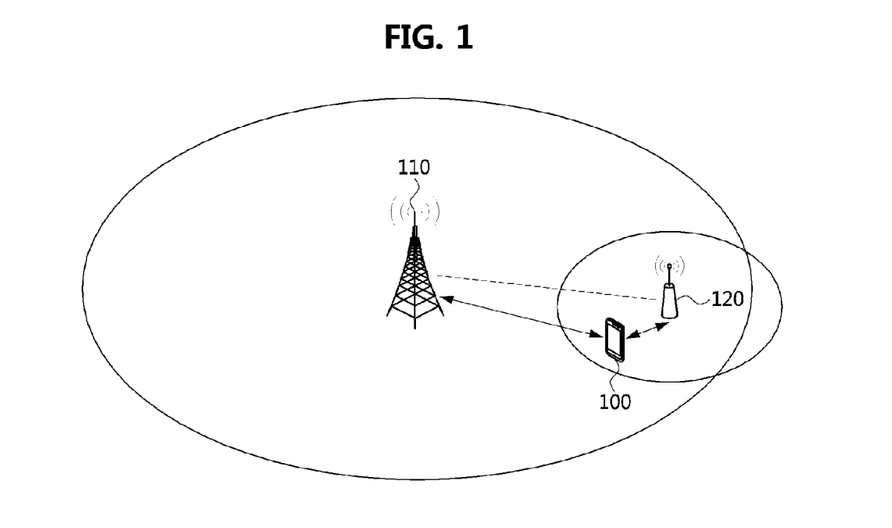
FIG. 1 is a conceptual diagram illustrating a network supporting dual connectivity.

FIG. 1 is a conceptual diagram illustrating a network supporting dual connectivity.

Referring to FIG. 1, a terminal (e.g., user equipment; UE) 100 may be connected with a master base station (master eNB; MeNB) 110 and a secondary base station (secondary eNB; SeNB) 120. Here, the MeNB 110 may be a base station managing a macro cell, and the SeNB 120 may be a base station managing a small cell. The MeNB 110 may be connected with the SeNB 120 via an ideal backhaul or a non-ideal backhaul.

The MeNB 110 may directly transmit control information and data packets to the UE 100. Alternatively, the MeNB 110 may transmit data packets to the UE 100 via the SeNB 120. For example, the MeNB 110 may transmit data packets to the SeNB 120, and the SeNB 120 may transmit the data packets received from the MeNB 110 to the UE 100. The UE 100 may receive the data packet from the SeNB 110.

Since the MeNB 110 may be connected with the SeNB 120 via the non-ideal backhaul, errors may occur in the data packets transmitted from the MeNB 110 to the SeNB 120. In this case, methods for retransmitting error data packets are required. Also, due to communication failures between the SeNB 120 and the UE 100, a situation in which the UE 100 cannot receive the data packets transmitted from the SeNB 120 may occur. In this case, the SeNB 120 may receive new data packets from the SeNB 110 although the data packets to be transmitted to the UE 100 still remain in a buffer. Thus, in order to resolve a problem of loads (e.g., data buffer overflow) in the SeNB 120, methods for controlling transmission of data packets are necessary.

A communication node constituting above-described wireless communication network (e.g., the base station, the terminal) may support a communication protocol based on code division multiple access (CDMA), a communication protocol based on wideband CDMA (WCDMA), a communication protocol based on time division multiple access (TDMA), a communication protocol based on frequency division multiple access (FDMA), a communication protocol based on single carrier-FDMA (SC-FDMA), a communication protocol based on orthogonal frequency division multiplexing (OFDM), a communication protocol based on orthogonal frequency division multiple access (OFDMA), and so on.

The base station of the communication node may be referred to a NodeB, an evolved NodeB, a base transceiver station (BTS), a radio base station, a radio transceiver, an access point, an access node, and so on. The terminal may be referred to a UE, an access terminal, a mobile terminal, a station, a subscriber station, a portable subscriber station, a mobile station, a node, a device, and so on. The communication node may have following structure.

Figure 2:
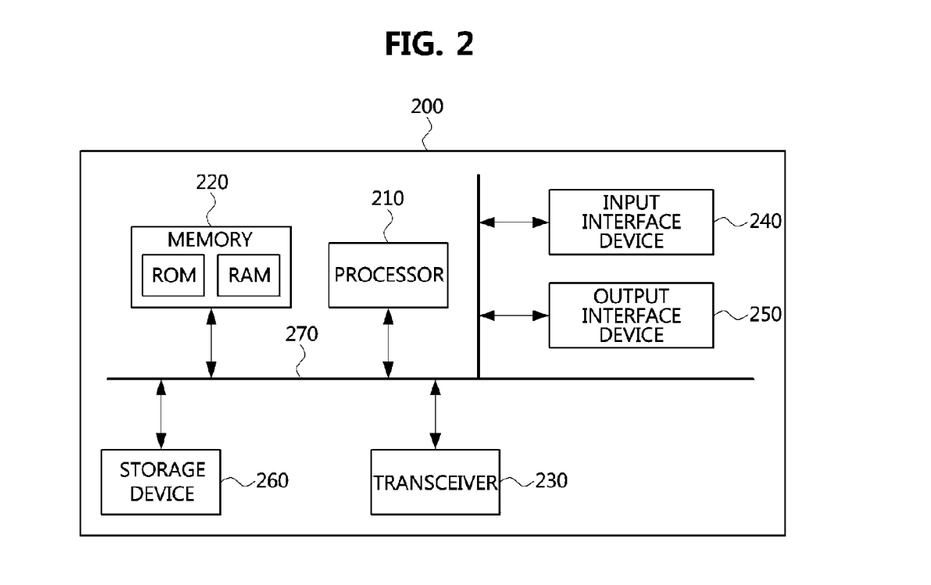
FIG. 2 is a block diagram illustrating an exemplary embodiment of a communication node constituting a wireless communication network.

FIG. 2 is a block diagram illustrating an exemplary embodiment of a communication node constituting a wireless communication network.

Referring to FIG. 2, a communication node 200 may include at least one processor 210, a memory 220 and a transceiver 230 connected to a network and performing communication. Further, the communication node 200 may include an input interface device 240, an output interface device 250, and a storage device 260. The respective components included in the communication node 200 may be connected via a bus 270 to communicate with each other.

The processor 210 may perform a program command stored in the memory 220 and/or the storage device 260. The processor 210 may be a central processing unit (CPU), a graphics processing unit (GPU) or a dedicated processor in which the methods according to an exemplary embodiment of the present discloser are performed. The memory 220 and the storage device 260 may include a volatile storage medium and/or a nonvolatile storage medium. For example, the memory 220 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the master base station is described, the secondary base station corresponding thereto may perform an operation corresponding to the operation of the master base station. On the contrary, when an operation of the secondary base station is described, the master base station may perform an operation corresponding to an operation of the secondary base station.

Figure 3:
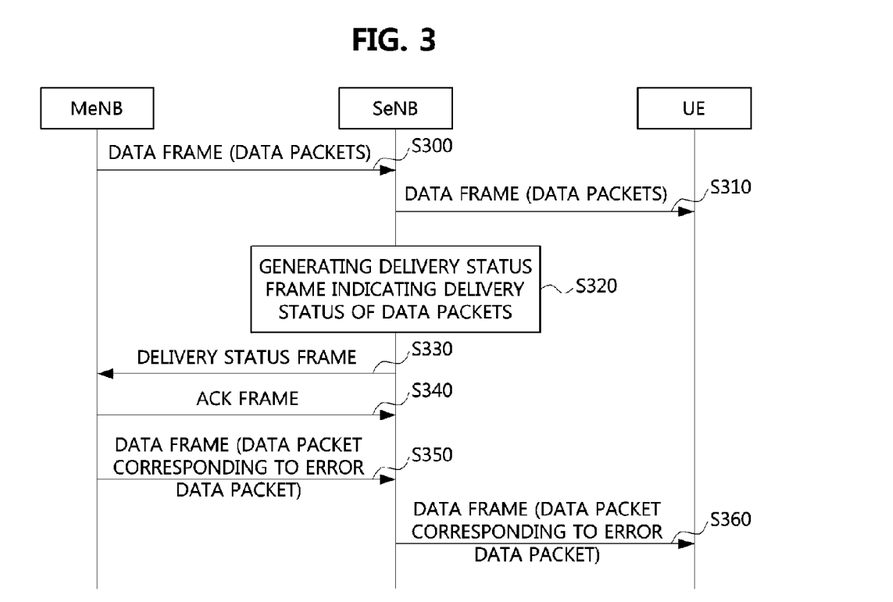
FIG. 3 is a sequence chart illustrating an exemplary embodiment of a method for retransmitting data packets.

FIG. 3 is a sequence chart illustrating an exemplary embodiment of a method for retransmitting data packets.

Referring to FIG. 3, the MeNB, the SeNB, and the UE may support dual connectivity. The MeNB, the SeNB, and the UE may form the network explained referring to FIG. 1. For example, the MeNB may be the master base station 110 in FIG. 1, the SeNB may be the secondary base station 120 in FIG. 1, and the UE may be the terminal 100 in FIG. 1. The structure of each of the MeNB, the SeNB, and the UE may be identical or similar to that of the communication node 200 explained referring to FIG. 2.

When the MeNB has a plurality of data packets to be transmitted to the UE, the MeNB may generate a data frame including the plurality of data packets. Each of the plurality of data packets may be generated based on a X2 user plane (UP) protocol. The data frame may further include at least one of information elements described in the following table 1 in addition to the plurality of data packets.

TABLE 1

| Kind | Content |
| --- | --- |
| First IE | Indication of a type of frame |
| Second IE | Respective sequence numbers of the plurality of data packets |

The first IE may indicate the type of the data frame. For example, when the first IE is set to a binary number '0,' the first IE may indicate that the current frame is the data frame including the plurality of data packets. Also, the second IE may indicate sequence numbers of the plurality of data packets generated based on the X2 UP protocol.

The MeNB may transmit the data frame to the SeNB through a bearer configured between the MeNB and the SeNB (e.g., evolved-universal terrestrial radio access network (E-UTRAN) radio access bearer (E-RAB)) (S300). The X2 UP protocol used for transmitting the data frame may correspond to a single bearer (e.g., E-RAB).

The SeNB may receive the data frame from the MeNB. The SeNB may obtain the information included in the data frame. The SeNB may identify that the data frame includes the plurality of data packets based on the first IE, and the sequence numbers of the plurality of data packets included in the data frame based on the second IE. The SeNB may generate a data frame including at least one data packet which has been successfully received among the plurality of data packets included in the data frame received from the MeNB. Then, the SeNB may transmit the generated data frame to the UE (S310). The data frame transmitted by the SeNB may also include at least one of the information elements described in the table 1.

The UE may receive the data frame from the SeNB. When the UE successfully receives the plurality of data packets included in the data frame, the UE may generate an acknowledgment (ACK) frame as a response to the data frame, and transmit the generated ACK frame to the SeNB. On the contrary, when the UE does not receive the data packets included in the data frame successfully, the UE may generate a negative ACK (NACK) frame as a response to the data frame, and transmit the generated NACK frame to the SeNB. Here, the operation of generating and transmitting the ACK frame or the NACK frame may be omitted (i.e., a case of using an implicit ACK/NACK procedure).

The SeNB may generate a delivery status frame indicating a transmission status of the data packets (S320). The delivery status frame may include at least one of information elements described in the following table 2.

TABLE 2

| Kind | Content |
| --- | --- |
| First IE | Indication of a type of frame |
| Second IE | Indication of the last sequence number among sequence numbers of data packets which have been transmitted to the terminal |
| Third IE | Indication of existence of a fourth IE indicating sequence number of error data packet |
| Fourth IE | Indicating sequence number of error data packet |
| Fifth IE | Indicating a size of a buffer for the bearer (e.g., E-RAB) |
| Sixth IE | Indicating a size of a buffer for the terminal |
| Seventh IE | Indicating a spare extension in the frame |

The first IE may indicate the type of the delivery status frame. For example, when the first IE is set to a binary number '1,' the first IE may indicate that the current frame is the delivery status frame including delivery status information of the data packet. The third IE may indicate existence of the fourth IE in the delivery status frame. For example, when the third IE is set to a binary number '0,' the third IE may indicate that the fourth IE does not exist in the delivery status frame. On the contrary, when the third IE is set to a binary number '1,' the third IE may indicate that the fourth IE exists in the delivery status frame.

The fourth IE may include the number of sequence number groups (or, ranges) each of which comprises continuous sequence numbers among sequence numbers of the error data packets, information indicating respective start sequence numbers of the sequence number groups, and information indicating respective end sequence numbers of the sequence number groups. For example, in a case that although the MeNB transmits data packets having sequence numbers 0 to 9 to the SeNB, the SeNB receives only data packets having sequence numbers 0, 1, 2, 6, and 9, a first sequence number group may include sequence numbers 3, 4, and 5, and a second sequence number group may include sequence numbers 7 and 8. Here, the number of sequence number groups may be 2. The start sequence number of the first sequence number group may be 3, and the end sequence number of the first sequence number group may be 5. Also, the start sequence number of the second sequence number group may be 7, and the end sequence number of the second sequence number group may be 8.

Also, the delivery status frame may include an information element indicating that it includes delivery status information (i.e., bearer-specific delivery status information) of data packets for each bearer (e.g., E-RAB). Also, the delivery status frame may include an information element indicating that it includes delivery station information (i.e., terminal-specific delivery status information) of data packets for each terminal.

Then, the SeNB may transmit the delivery status frame to the MeNB (S330). The delivery station frame may be transmitted to the MeNB through the bearer through which the data frame is transmitted (e.g., E-RAB). The MeNB may receive the delivery status frame from the SeNB. Upon receiving the delivery status frame successfully, the MeNB may transmit an ACK frame to the SeNB (S340). Upon receiving the ACK frame from the MeNB, the SeNB may identify that the delivery status frame has been successfully received at the MeNB.

On the contrary, in a case that the delivery status frame has not been successfully received at the MeNB, the MeNB may transmit a NACK frame to the SeNB. Upon receiving the NACK frame from the MeNB, the SeNB may identify that the delivery status frame has not been successfully received at the MeNB. Therefore, the SeNB may retransmit the delivery status frame to the MeNB. Here, as above-described, the transmission of the ACK frame or the NACK frame may be omitted.

Alternatively, the MeNB may transmit a data frame including data packets corresponding to the error data packets to the SeNB instead of the ACK frame. That is, the data frame in response to the deliver status frame may also act a role of the ACK frame, and this means one of the implicit ACK/NACK cases. When the SeNB receives the data frame including data packets corresponding to the error data packets from the MeNB within a predetermined time after a time of completion of the delivery status frame transmission, the SeNB may identify that the delivery status frame has been successfully received at the MeNB.

On the contrary, in a case the SeNB does not receive the data frame including data packets corresponding to the error data packets from the MeNB within the predetermined time after the time of completion of the delivery status frame transmission, the SeNB may identify that the delivery status frame has not been successfully received at the MeNB. In this case, the SeNB may retransmit the delivery status frame to the MeNB, and recount the predetermined time. Also, in the case that the SeNB identifies that the delivery status frame has not been successfully received at the MeNB, the SeNB may decrease or increase an error counter by a predetermined value (e.g., 1). When the error counter reaches a predetermined threshold value, the SeNB may determine that the data packet transmission between the MeNB and the SeNB becomes impossible.

The MeNB may obtain information elements from the received delivery status frame. Based on the first IE, the MeNB may identify that the delivery status frame includes delivery status information of data packets. The MeNB may identify whether the plurality of data packets transmitted from the MeNB have been successfully received at the SeNB based on the second IE and the third IE included in the delivery status frame. For example, when a sequence number indicated by the second IE is identical to the largest sequence number (i.e., the last sequence number) among sequence numbers of the plurality of data packet transmitted by the MeNB, and the third IE indicates that the fourth IE does not exist in the delivery status frame, the MeNB may identify that all of the plurality of data packets have been successfully received at the SeNB. In other cases, the MeNB may identify that at least one data packet among the plurality of data packets transmitted by the MeNB has not been successfully received at the SeNB.

The MeNB may identify error data packets based on the second IE and the third IE included in the delivery status frame, or based on the second IE, the third IE, and the fourth IE included in the delivery status frame.

For example, in a case that the sequence number indicated by the first IE is smaller than the largest sequence number (i.e., the last sequence number) among sequence numbers of the plurality of data packets transmitted by the MeNB, and the third IE indicates that the fourth IE does not exist in the delivery status frame, the MeNB may identify that data packets having sequence numbers from the sequence number indicated by the first IE to the largest sequence number among sequence numbers of the plurality of data packets transmitted by the MeNB are lost or in error. The MeNB may generate a data frame include data packets corresponding to the error data packets for retransmission. Also, the MeNB may delete the data packets which are identified to have been successfully received at the SeNB from the buffer of the MeNB.

As another example, in a case that the sequence number indicated by the first IE is smaller than the largest sequence number (i.e., the last sequence number) among sequence numbers of the plurality of data packets transmitted by the MeNB, and the third IE indicates that the fourth IE exists in the delivery status frame, the MeNB may identify error data packets based on the information on the number of sequence number groups, respective start sequence numbers of sequence number groups, and respective end sequence numbers of sequence number groups included in the fourth IE. When the fourth IE is configured as represented in the below table 3, the MeNB may identify the data packets corresponding to the sequence numbers 3, 4, 5, 7, and 8 as the error data packets.

TABLE 3

| | |
|---|---|
| The number of sequence number groups | 2 |
| Start sequence number of sequence number group 1 | 3 |
| End sequence number of sequence number group 1 | 5 |
| Start sequence number of sequence number group 2 | 7 |
| End sequence number of sequence number group 2 | 8 |

The MeNB may generate a data frame including data packets corresponding to the error data packets. Also, the MeNB may delete the data packets that have been successfully received at the SeNB from the buffer of the MeNB.

The MeNB may transmit the data frame including data packets corresponding to the error data packets to the SeNB (S350). The data frame may further include at least one of the information elements described in the table 1 in addition to data packets corresponding to the error data packets. The SeNB may receive the data frame including data packets corresponding to the error data packets from MeNB. The SeNB may obtain the information elements from the data frame. The SeNB may identify that the data frame includes data packets corresponding to the error data packets based on the first IE, and that the sequence numbers of the data packets included in the data frame based on the second IE.

When the SeNB has successfully received data packets corresponding to the error data packets included in the data frame, the SeNB may transmit a data frame including data packets corresponding to the error data packets (i.e., retransmitted data packets) to the UE (S360). The data frame transmitted by the SeNB may include at least one of the information elements described in the table 1. When the UE successfully receives the data frame including data packets corresponding to the error data packets from the SeNB, the UE may transmit an ACK frame to the SeNB. On the contrary, when the UE does not successfully receive the data frame including data packets corresponding to the error data packets from the SeNB, the UE may transmit a NACK frame to the SeNB. Here, the transmission of the ACK frame or the NACK frame may be omitted.

Figure 4:
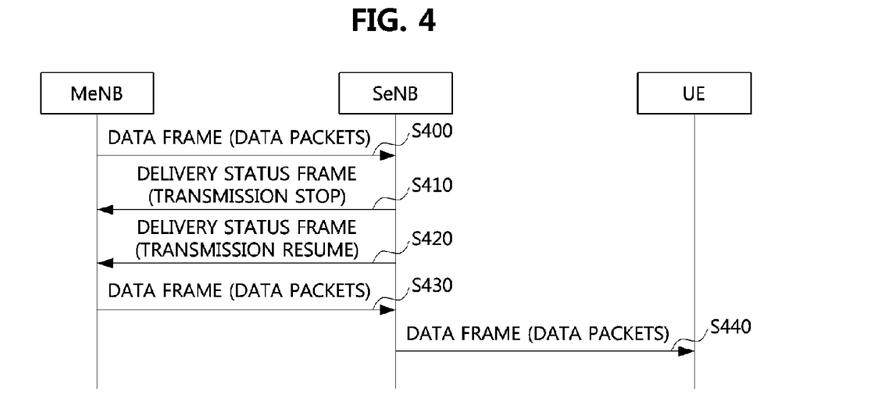
FIG. 4 is a sequence chart illustrating an exemplary embodiment of a method for controlling data packet transmission.

FIG. 4 is a sequence chart illustrating an exemplary embodiment of a method for controlling data packet transmission.

Referring to FIG. 4, the MeNB, the SeNB, and the UE may support dual connectivity. The MeNB, the SeNB, and the UE may form the network explained referring to FIG. 1. For example, the MeNB may be the master base station 110 in FIG. 1, the SeNB may be the secondary base station 120 in FIG. 1, and the UE may be the terminal 100 in FIG. 1. The structure of each of the MeNB, the SeNB, and the UE may be identical or similar to that of the communication node 200 explained referring to FIG. 2.

When the MeNB has a plurality of data packet to be transmitted to the UE, the MeNB may generate a data frame including the plurality of data packets. Each of the plurality of data packets may be generated based on the X2 UP protocol. The data frame may further include at least one of the information elements described in the table 1 in addition to the plurality of data packets. The MeNB may transmit the data frame to the SeNB (S400). The SeNB may receive the data frame from the MeNB. When the SeNB cannot transmit the data frame to the UE due to a communication failure, etc. between the SeNB and the UE, the SeNB may generate a delivery status frame requesting the MeNB to stop transmission of data packets.

The delivery status frame may include an information element requesting to stop the transmission of data packets. In order to request to stop the transmission of data packets for a specific bearer (e.g., E-RAB) between the MeNB and the SeNB, the delivery status frame may include an information element indicating the specific bearer. Also, the delivery status frame may further include an information element indicating a specific terminal in order to request to stop transmission of data packets for the specific terminal.

The SeNB may transmit the delivery status frame requesting to stop transmission of data packets to the MeNB (S410). The delivery status frame may be transmitted through the bearer (e.g., E-RAB) through which the data frame is transmitted. The MeNB may receive the delivery status frame from the SeNB, and identify that the stop of the transmission of data packets is requested (or, stopping transmission of data packets for a specific bearer (e.g., E-RAB) or stopping transmission of data packets for a specific terminal). The MeNB may stop transmission of data packets according to the request of the SeNB.

Upon receiving the delivery status frame successfully, the MeNB may transmit an ACK frame to the SeNB in response to the delivery status frame. The ACK frame may include an information element indicating a specific bearer (e.g., E-RAB) in order to indicate that the request of stopping transmission of data packets for the specific bearer has been received. Also, the ACK frame may include an information element indicating a specific terminal in order to indicate that the request of stopping transmission of data packets for the specific terminal has been received. On the contrary, when the MeNB does not receive the delivery status frame successfully, the MeNB may transmit a NACK frame to the SeNB. The NACK frame may include an information element indicating a specific bearer (e.g., E-RAB) in order to indicate that the MeNB has not received the request of stopping transmission of data packets for the specific bearer. Also, the NACK frame may include an information element indicating a specific terminal in order to indicate that the MeNB has not received the request of stopping transmission of data packets for the specific terminal.

In a case that the SeNB can transmit a data frame to the UE, the SeNB may generate a delivery status frame requesting to resume transmission of data packets. The delivery status frame may include an information element requesting to resume transmission of data packets. In order to request to resume data packet transmission for a specific bearer (e.g., E-RAB) between the MeNB and the SeNB, the delivery status frame may include an information element indicating the specific bearer. Also, the delivery status frame may include an information element indicating a specific terminal in order to request to resume data packet transmission for the specific terminal.

The SeNB may transmit the delivery status frame requesting to resume data packet transmission to the MeNB (S420). Here, the delivery status frame may be transmitted through the bearer (e.g., E-RAB) through which the data packets are transmitted. The MeNB may receive the delivery status frame from the SeNB, and identify that data packet transmission has been requested to resume (e.g., resuming per-bearer data packet transmission or resuming per-terminal data packet transmission) based on the delivery status frame.

When MeNB has successfully received the delivery status frame, the MeNB may transmit an ACK frame to the SeNB in response to the delivery status frame. Here, the ACK frame may include an information element indicating a specific bearer (e.g., E-RAB) in order to indicate that the request of resuming data packet transmission for the specific bearer has been received. Also, the ACK frame may include an information element indicating a specific terminal in order to indicate that the request of resuming data packet transmission for the specific terminal has been received.

On the contrary, when the MeNB has not successfully received the delivery status frame, the MeNB may transmit a NACK frame to the SeNB. Here, the NACK frame may include an information element indicating a specific bearer in order to indicate that the request of resuming data packet transmission for the specific bearer has not been received. Also, the NACK frame may include an information element indicating a specific terminal in order to indicate that the request of resuming data packet transmission for the specific terminal has not been received. The SeNB may retransmit the delivery status frame to the MeNB in response to the NACK frame. Here, the transmission of the ACK frame or the NACK frame may be omitted.

Alternatively, the MeNB may transmit a data frame including data packets corresponding to the error data packets to the SeNB instead of the ACK frame. When the SeNB receives the data frame including data packets corresponding to the error data packets from the MeNB within a predetermined time after a time of completion of the transmission of the delivery status frame requesting to resume data packet transmission, the SeNB may identify that the delivery status frame has been successfully received at the MeNB.

On the contrary, when the SeNB does not receive the data frame including data packets corresponding to the error data packets from the MeNB within the predetermined time after the time of completion of the delivery status frame transmission, the SeNB may identify that the delivery status frame has not been successfully received at the MeNB. In this case, the SeNB may retransmit the delivery status frame to the MeNB, and recount the predetermined time. Also, in the case that the SeNB identifies that the delivery status frame has not been successfully received at the MeNB, the SeNB may decrease or increase an error counter by a predetermined value (e.g., 1). When the error counter reaches a predetermined threshold value, the SeNB may determine that the data packet transmission between the MeNB and the SeNB becomes impossible.

When the MeNB receives the deliver status frame requesting to resume data packet transmission from the SeNB, or transmits the ACK frame for the delivery status frame requesting to resume data packet transmission to the SeNB, the MeNB may transmit a data frame including data packets to the SeNB (S430). The SeNB may receive the data frame from the MeNB, and transmit the received data frame to the UE (S440).

Figure 5:
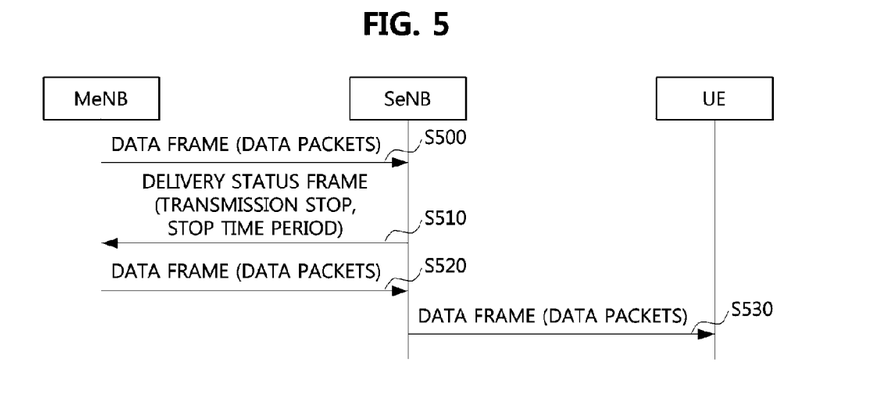
FIG. 5 is a sequence chart illustrating another exemplary embodiment of a method for controlling data packet transmission.

FIG. 5 is a sequence chart illustrating another exemplary embodiment of a method for controlling data packet transmission.

Referring to FIG. 5, the MeNB, the SeNB, and the UE may support dual connectivity. The MeNB, the SeNB, and the UE may form the network explained referring to FIG. 1. For example, the MeNB may be the master base station 110 in FIG. 1, the SeNB may be the secondary base station 120 in FIG. 1, and the UE may be the terminal 100 in FIG. 1. The structure of each of the MeNB, the SeNB, and the UE may be identical or similar to that of the communication node 200 explained referring to FIG. 2.

When the MeNB has a plurality of data packets to be transmitted to the UE, the MeNB may generate a data frame including the plurality of data packets. Each of the plurality of data packets may be generated based on the X2 UP protocol. The data frame may further include at least one of the information elements described in the table 1 in addition to the plurality of data packets. The MeNB may transmit the data frame to the SeNB (S500). The SeNB may receive the data frame from the MeNB. When the SeNB cannot transmit the data frame to the UE due to a communication failure, etc. between the SeNB and the UE, the SeNB may generate a delivery status frame requesting the MeNB to stop transmission of data packets.

The delivery status frame may include an information element requesting to stop data packet transmission, and an information element indicating a time period (i.e., 'stop time period') during which the data packet transmission is to be stopped. The delivery status frame may include an information element indicating a specific bearer (e.g., E-RAB) in order to indicate to stop transmission of data packets for the specific bearer. Also, the delivery status frame may include an information element indicating a specific terminal in order to indicate to stop transmission of data packets for the specific terminal.

The SeNB may transmit the delivery status frame requesting to stop transmission of data packets to the MeNB (S510). The delivery status frame may be transmitted through the bearer (e.g., E-RAB) through which the data frame is transmitted. The MeNB may receive the delivery status frame from the SeNB, and identify that the stop of the transmission of data packets has been requested (e.g., stopping transmission of data packets for a specific bearer (e.g., E-RAB) or stopping transmission of data packets for a specific terminal). Also, the MeNB may identify the time period (i.e., 'stop time period') during which the data packet transmission is to be stopped based on the delivery status frame. The MeNB may stop transmission of data packets according to the request of the SeNB.

Meanwhile, upon receiving the delivery status frame successfully, the MeNB may transmit an ACK frame to the SeNB in response to the delivery status frame. The ACK frame may include an information element indicating a specific bearer (e.g., E-RAB) in order to indicate that the request of stopping transmission of data packets for the specific bearer has been received. Also, the ACK frame may include an information element indicating a specific terminal in order to indicate that the request of stopping transmission of data packets for the specific terminal has been received. On the contrary, when the MeNB has not successfully received the delivery status frame, the MeNB may transmit a NACK frame to the SeNB. The NACK frame may include an information element indicating a specific bearer (e.g., E-RAB) in order to indicate that the MeNB has not received the request of stopping transmission of data packets for the specific bearer. Also, the NACK frame may include an information element indicating a specific terminal in order to indicate that the MeNB has not received the request of stopping transmission of data packets for the specific terminal. The transmission of the ACK frame or the NACK frame may be omitted.

Also, the MeNB may resume the stopped data packet transmission and restart transmission of the data frame including data packets to the SeNB after the time period (i.e., 'stop time period') indicated by the delivery status frame has expired (S520). The SeNB may receive the data frame from the MeNB, and transmit the received data frame to the UE (S530).

Figure 6:
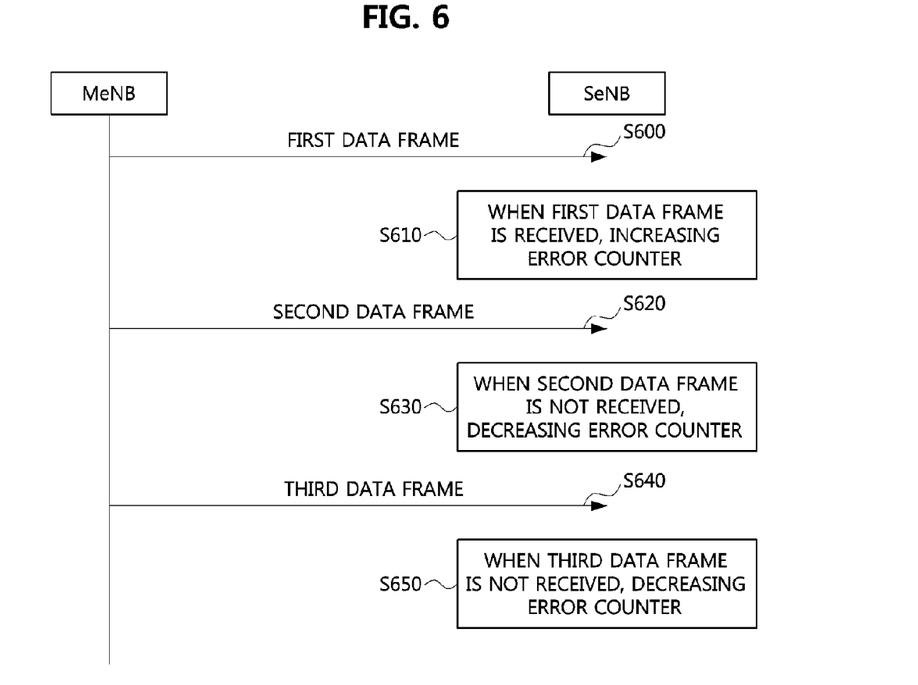
FIG. 6 is a sequence chart illustrating an exemplary embodiment of a method for identifying a status of a bearer between base stations.

FIG. 6 is a sequence chart illustrating an exemplary embodiment of a method for identifying a status of a bearer between base stations.

Referring to FIG. 6, the MeNB and the SeNB may support dual connectivity. The MeNB and the SeNB may form the network explained referring to FIG. 1. For example, the MeNB may be the master base station 110 in FIG. 1, and the SeNB may be the secondary base station 120 in FIG. 1. The structure of each of the MeNB and the SeNB may be identical or similar to that of the communication node 200 explained referring to FIG. 2.

When the MeNB has a plurality of data packets to be transmitted to the UE, the MeNB may generate a first data frame including the plurality of data packets. Each of the plurality of data packets may be generated based on the X2 UP protocol. The MeNB may transmit the first data frame to the SeNB (S600). In a case that the SeNB receives the plurality of data packets included in the first data frame successfully, the SeNB may increase an error counter (S610). For example, the SeNB may increase the error counter by 1.

Then, when the MeNB has new data packets to be transmitted to the UE, the MeNB may generate a second data frame including the new data packets. The MeNB may transmit the second data frame to the SeNB (S620). In a case that the SeNB does not receive the plurality of data packets included in the second data frame successfully, the SeNB may decrease the error counter (S630). For example, the SeNB may decrease the error counter by 1.

Then, when the MeNB has new data packets to be transmitted to the UE, the MeNB may generate a third data frame including the new data packets. The MeNB may transmit the third data frame to the SeNB (S640). In a case that the SeNB does not receive the plurality of data packets included in the third data frame successfully, the SeNB may decrease the error counter (S650). When the error counter reaches a value equal to or smaller than a predetermined threshold value through the above-described procedure, the SeNB may determine that data packets cannot be received from the MeNB through a bearer (e.g., E-RAB) between the MeNB and the SeNB.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present invention or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present invention, and vice versa.

According to an embodiment of the present invention, it is possible to easily determine a state (that is, a normal state or a fault state) of each of communication nodes constituting a vehicle network and a state of a channel (or port) to which the communication node is connected. A communication node and channel in a fault state may be quickly repaired based on the determination result. Thus the performance of the vehicle network may be enhanced.

While the example embodiments of the present invention and their advantages have been described in detail, it should be understood that various changes, substitutions and alterations may be made herein without departing from the scope of the invention.

What is claimed is:

1. An operation method of a master base station in a network, the method comprising:
   transmitting a data frame including a plurality of data packets to a secondary base station;
   receiving, from the secondary base station, a delivery status frame requesting retransmission of an error data packet among the plurality of data packets through an X2 interface between the master base station and the secondary base station; and
   retransmitting data packet corresponding to the error data packet indicated by the delivery status frame to the secondary base station, wherein the delivery status frame includes a first information element (IE) indicating a type of the delivery status frame and a second IE indicating a last sequence number among sequence numbers of data packets which have been transmitted from the secondary base station to a terminal.

2. The operation method according to claim 1, wherein the data frame includes information indicating a type of the data frame and information indicating respective sequence numbers of the plurality of data packets.

3. The operation method according to claim 1, wherein the delivery status frame further includes a third IE indicating existence of a fourth IE indicating the error data packet and the fourth IE.

4. The operation method according to claim 3, wherein the delivery status frame further includes a fifth IE indicating a size of a buffer for a bearer between the master base station and the secondary base station, and a sixth IE indicating a size of a buffer for the terminal.

5. The operation method according to claim 3, wherein the fourth IE includes information indicating a number of sequence number groups each of which comprises continuous sequence numbers among sequence numbers of the error data packet, information indicating respective start sequence numbers of the sequence number groups, and information indicating respective end sequence numbers of the sequence number groups.

6. The operation method according to claim 1, further comprising:
deleting data packets which are not indicated as the error data packet by the delivery status frame among the plurality of data packets from a buffer of the master base station.

7. The operation method according to claim 1, wherein the plurality of data packets are transmitted to a terminal via the secondary base station, and the terminal is connected with the master base station and the secondary base station.

8. An operation method of a secondary base station in a network, the method comprising:
receiving a data frame including a plurality of data packets from a master base station;
generating a delivery status frame requesting retransmission of error data packet among the plurality of data packets; and
transmitting the delivery status frame to the master base station through an X2 interface between the master base station and the secondary base station,
wherein the delivery status frame includes a first information element (IE) indicating a type of the delivery status frame and a second IE indicating a last sequence number among sequence numbers of data packets which have been transmitted from the secondary base station to a terminal.

9. The operation method according to claim 8, wherein the data frame includes information indicating a type of the data frame and information indicating respective sequence numbers of the plurality of data packets.

10. The operation method according to claim 8, wherein the delivery status frame further includes a third IE indicating existence of a fourth IE indicating the error data packet and the fourth IE.

11. The operation method according to claim 10, wherein the delivery status frame further includes a fifth IE indicating a size of a buffer for a bearer between the master base station and the secondary base station, and a sixth IE indicating a size of a buffer for the terminal.

12. The operation method according to claim 10, wherein the fourth IE includes information indicating a number of sequence number groups each of which comprises continuous sequence numbers among sequence numbers of the error data packet, information indicating respective start sequence numbers of the sequence number groups, and information indicating respective end sequence numbers of the sequence number groups.

13. The operation method according to claim 8, further comprising:
receiving a data frame including data packet corresponding to the error data packet indicated by the delivery status frame from the master base station.

14. The operation method according to claim 8, wherein the plurality of data packets are transmitted to a terminal via the secondary base station, and the terminal is connected with the master base station and the secondary base station.

15. An operation method of a first base station in a network, the method comprising:
transmitting a first frame including a plurality of data units to a second base station; and
receiving, from the second base station, a second frame indicating delivery status of the plurality of data units included in the first frame through an X2 interface between the first base station and the second base station,
wherein the second frame is generated by the second base station, and
wherein the second frame includes information indicating a last sequence number among sequence numbers of data units which have been transmitted from the secondary base station to a terminal.

16. An operation method of a second base station in a network, the method comprising:
receiving a first frame including a plurality of data units from a first base station;
generating a second frame indicating delivery status of the plurality of data units included in the received first frame; and
transmitting the second frame to the first base station through an X2 interface between the first base station and the second base station,
wherein the second frame includes information indicating a last sequence number among sequence numbers of data units which have been transmitted from the secondary base station to a terminal.

* * * * *